United States Patent [19]

Goings

[11] 3,793,698

[45] Feb. 26, 1974

[54] METHOD OF REPAIRING CAVITATION DAMAGE ON A HYDRAULIC TURBINE

[76] Inventor: Iden Dean Goings, 4858 N. 13th St., Terre Haute, Ind. 47805

[22] Filed: Jan. 8, 1973

[21] Appl. No.: 322,042

[52] U.S. Cl...................... 29/401, 29/156.8 B, 82/4
[51] Int. Cl............................................... B23p 7/00
[58] Field of Search.. 29/401, 559, 156.8 B; 137/15; 82/4

[56] References Cited
UNITED STATES PATENTS

| | | | |
|---|---|---|---|
| 2,546,225 | 3/1951 | Julian et al. | 82/4 X |
| 2,818,685 | 1/1958 | Becker | 82/4 X |
| 3,521,346 | 7/1970 | Tongurian | 29/401 X |
| 3,704,500 | 12/1972 | Okamoto | 29/156.8 B X |
| 3,711,927 | 1/1973 | Davidson | 29/401 |

*Primary Examiner*—Charles W. Lanham
*Assistant Examiner*—D. C. Reiley, III
*Attorney, Agent, or Firm*—Woodard, Weikart, Emhardt & Naughton

[57] ABSTRACT

The method disclosed involves installation of welding, machining, etc. apparatus on the turbine runner itself, the apparatus extending into close proximity to the turbine draft or discharge tube wall, and then mechanically rotating the turbine runner so that the machining or other apparatus is moved over the wall for conditioning or repairing it. In effect, a vertical boring mill is formed using the runner of the turbine itself as a tool.

4 Claims, 4 Drawing Figures

METHOD OF REPAIRING CAVITATION DAMAGE ON A HYDRAULIC TURBINE

BACKGROUND OF THE INVENTION

Hydroelectric installations conventionally consist of a plurality of electrical generator units each powered by a hydraulic turbine whose runner or rotor shaft is concentric with the vertically mounted generator rotor, water moving by gravity through the turbine draft tube and rotating the turbine runner. Gates control the entry and exit of water to the turbine. In such installations a recurring, serious problem is the large amount of downtime conventionally required, at intervals, of each generating unit as its draft tube liner walls and runner blade are repaired and resurfaced to remedy the pitting and surface deterioration caused by cavitation.

Cavitation occurs when the vacuum normally found at local points within the turbine runner and draft tube reach a value at which bubbles of water vapor are formed. These bubbles collapse with a violent action further along the flow path where the pressure is slightly increased. The cavitation thus occuring causes a loss in efficiency and results in pitting of the metal and concrete surfaces where the vapor bubbles collapse. The metal surface is broken down so that clean metal is exposed, oxidation then proceeds rapidly and a cavity is produced. As the process continues, honeycombing of the material of the runner and draft tube results. Where cavitation is extreme, runner blades having a thickness of one inch may be corroded through in less than a year's operation. Experience has shown that pitting occurs most commonly at the back of the runner blades, near where water leaves the runner, and on the wall of the upper portion of the draft tube. Improvement in the design of the turbine and its setting, by providing contours of easy curvature, can minimize the problem but do not eliminate it. The cost of design changes are such, however, that it is usually cheaper to repair, at intervals of for example once a year, the damage done by cavitation than to prevent all cavitation.

In the past such repair has been accomplished by various techniques involving hand-held arc-air equipment to blast off material at the pitted surface area of the draft tube and runner, and arc-welding stainless steel or other filling material onto the prepared surfaces. These conventional methods are slow and the down time of the hydroelectric unit being serviced is lengthy. They do not lend themselves to automatic or semi-automatic tooling.

The method of the present invention involves installing machining tooling on the runner which extends into operative engagement with the tube wall. A collector ring assembly is installed at the free end of the runner to permit electrical power and pneumatic pressure to be accessible on the runner itself. A power unit is provided which mechanically rotates the runner relatively slowly causing the cutting tool to move over the tube wall. By proper adjustment and observation by an operator riding on the slowly rotating runner, the machining of the draft tube wall may proceed in semi-automatic fashion, thus preparing the wall for application, by welding, of stainless steel to the draft tube surface. Welding equipment including welding rod feeding reels are also installed, by suitable scaffolding, on the runner so that the welding or metal-filling operation on the tube wall can also proceed semi-automatically as the runner is slowly rotated. Repair of pitted areas on the runner blades themselves may also proceed during this operation by using hand held air-arc tools and hand welding and grinding tools. In effect, vertical boring mill tooling is utilized in preparing the draft tube surface for the weld metal application and this is made possible by using the turbine runner itself as the rotating component of the tooling. This use of the turbine runner itself as part of the tooling contrasts with the slower, hand tool operation of conventional techniques, and results in a thirty to fifty per cent reduction in repair down time of the generating unit. In addition, the machining and welding operation done in accord with the method of the present invention leaves an improved and more uniform surface on the repaired draft tube area as compared to the results obtained with conventional techniques. Herein the tooling attached to the turbine runner, is at times, referred to collectively as conditioning devices and, it will be understood, this includes machining, welding, grinding and similar draft tube surface conditioning apparatus.

DESCRIPTION OF THE METHOD

Figure 1:
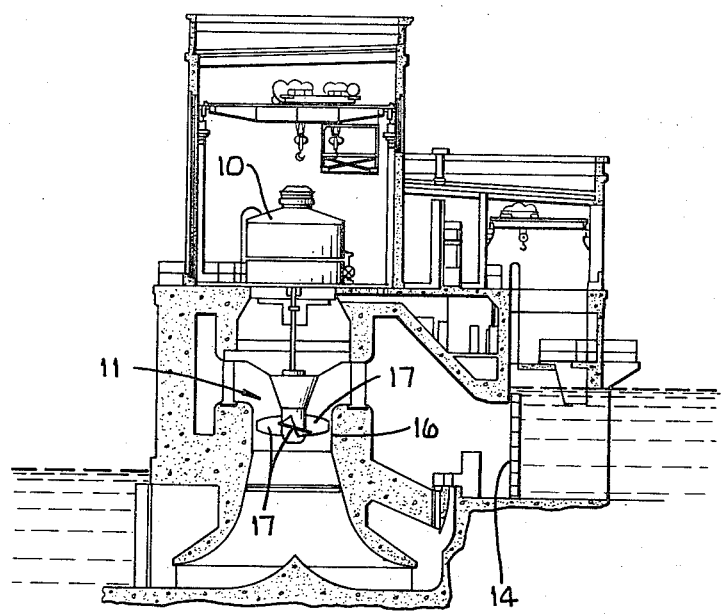
FIG. 1 is a sectional view generally illustrating a typical hydroelectric installation.

Referring initially to FIG. 1, there is shown a hydroelectric installation which includes a generator 10 whose rotor is moved by the runner or rotor, indicated generally at 11, of a hydraulic turbine. Gates 14 control the entry of water into the draft tube 16 of the turbine, the blades 17 of the turbine runner being disposed within the upper cylindrical portion of the draft tube. The rotational axis of the turbine runner is concentric with the rotational axis of the rotor of the generator 10.

Figure 2:
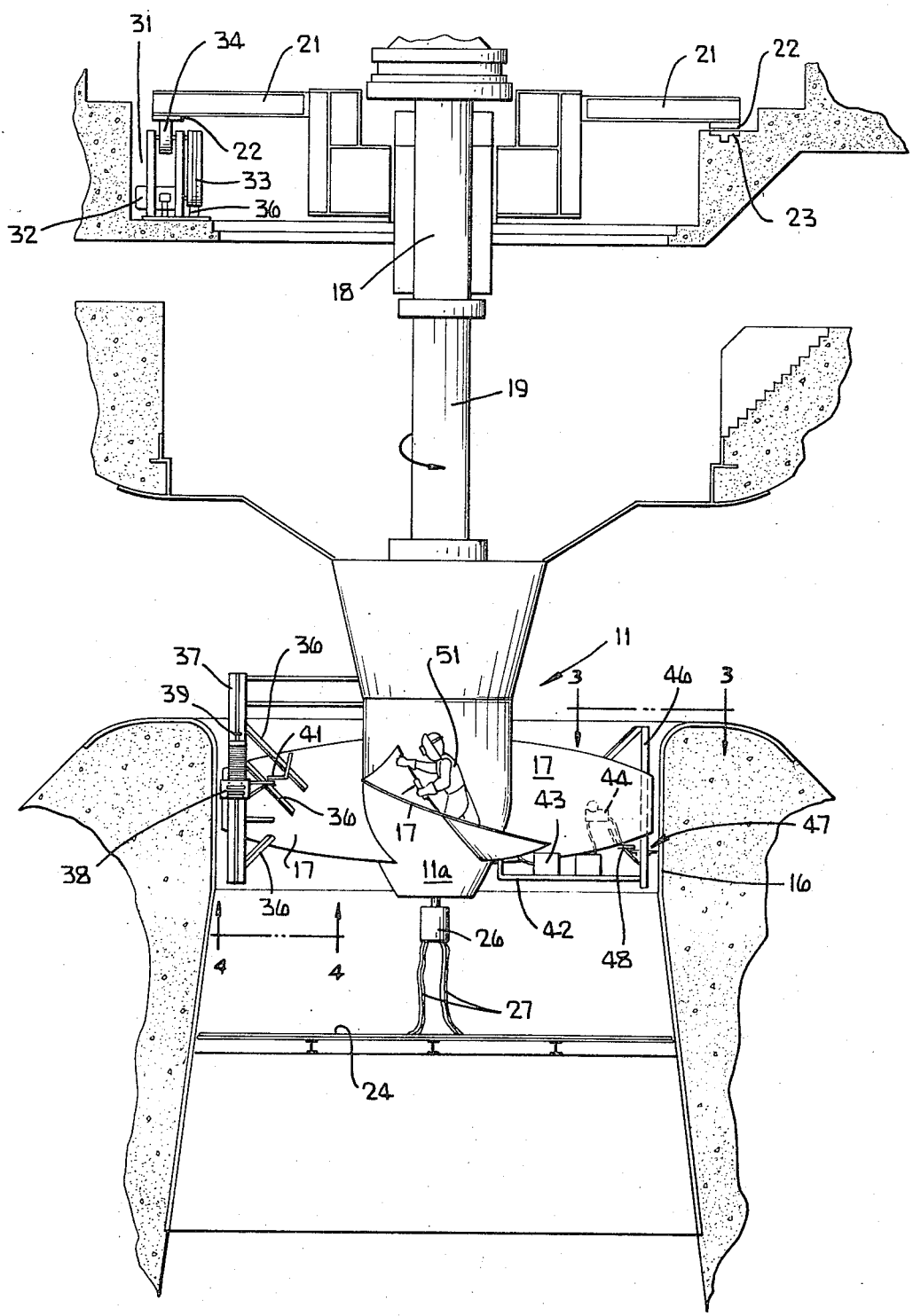
FIG. 2 is a sectional, enlarged view of a portion of the structure shown in FIG. 1 undergoing the repair method of the present invention.

Referring to FIG. 2, the generator rotor shaft is indicated at 18 and it is, as previously mentioned, concentric with and rigidly attached to the turbine shaft 19. The generator rotor has an extending portion 31 which carries an annular shoe 22 adapted to cooperate with an adjacent member 23 which provides for braking the movement of the rotor in the event of a failure of bearing lubrication or other emergency. This structure is conventional in hydroelectric installations.

The inner surface of the wall of the draft tube 16 and the surfaces of the runner blades are subject to erosion and pitting, primarily caused by cavitation as previously explained. In practicing the method of the present invention to repair and resurface these components, initially the gates are closed and by pumping, where necessary, water is removed from the draft tube and runner area of the installation. A temporary floor structure 24 is then constructed across the draft tube below the runner hub 11a. A collector ring assembly, shown schematically at 26 is then attached to the lower end of the runner, the collector ring providing for transferring electrical power and pneumatic lines (indicated schematically at 27 in FIG. 2) into the runner 11 which, as the method of the present invention proceeds, is rotated while the floor surface 24, of course, remains stationary. The collector ring assembly 26 is of conventional construction and provides access to electrical and pneumatic tooling power on the runner 11.

Concurrent with or subsequent to this preparatory step in the method, an external, temporary power unit, indicated schematically at 31 is installed adjacent the portion 21 which, as previously mentioned, rotates with the generator rotor. The power unit 31 may include an electric motor 32 which drives V-belts 33, which in turn drive a roller or traction member 34 which engages the adjacent face of the annular track 22 carried by the generator rotor portion 21. A suitable control panel 36 may be provided for controlling the drive motor 32 and, it will be understood, through reduction gearing between the motor and the traction member 34, energization of the motor will result in a relatively slow rotation of the generator rotor shaft 18 and, consequently, of the runner shaft 19 and runner 11. The speed of rotation of the runner 11 may be controlled at the control panel 36 but for normal machining and welding operation on the draft tube 16 will be of the order of three or four revolutions per minute when the draft tube diameter is of the order of 22 feet. This provides a linear speed for the tips of the runner blades 17 with respect to the stationary draft tube wall of the order of 300 feet per minute.

Either concurrently with or subsequent to the installation of the structures mentioned above, suitable support members 36 may be welded to the surface of one of the runner blades 17 and these supports mount a vertical member 37 upon which travels a cutting or machining tool holding head 38 which can be adjustably positioned along the vertical member 37 by means of the adjustment wheel 39. The structure carries a seat 41 for an operator riding the structure and observing the machining operation. A machining tool extends from the head 38 into machining engagement with the adjacent draft tube wall surface.

Figure 3:
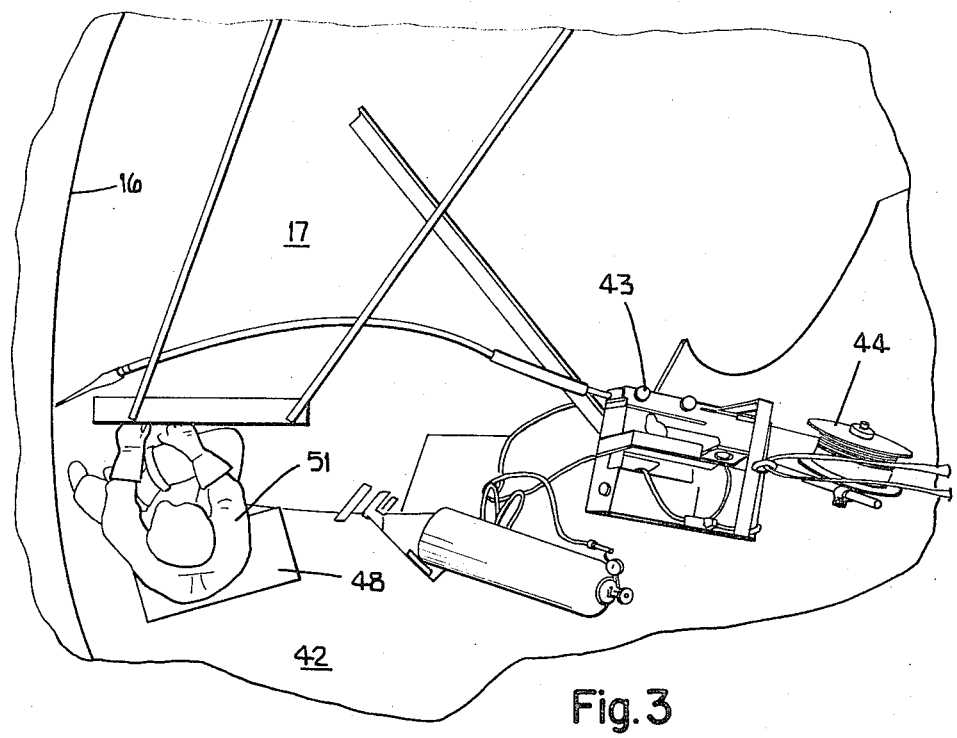
FIG. 3 is a perspective view taken generally from the top of the draft tube and in the direction indicated by the lines 3—3 in FIG. 2.
Figure 4:
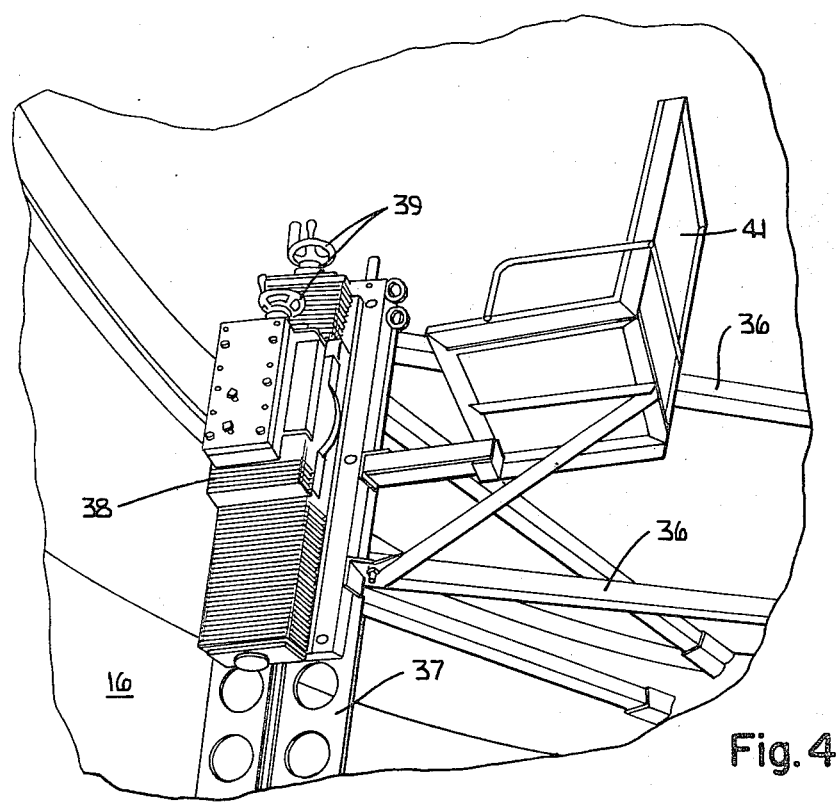
FIG. 4 is a fragmentary, perspective view of a portion of the structure shown in FIG. 2 and taken generally in the direction of the lines 4—4 in FIG. 2.

Scaffolding 42 is temporarily attached to and supported by the runner blades 17 and supports welding apparatus 43 including the welding rod supply reel 44. The scaffolding structure carries the vertical member 46 and member 46 supports a vertically movable welding head indicated schematically at 47, the head being adjustably movable vertically along the member 46. And an operator seat 48 is provided for movement with the head 47. As will be evident from FIG. 3, as the turbine runner is rotated slowly the welding head 47 will traverse the curved surface of the tube wall 16. As will be evident from FIG. 2, the arrangement of the scaffolding 42 and welding equipment is such that a welder (identified at 51 in FIG. 3) can weld pitted areas of the blades 17 as the slow rotation of the runner proceeds.

After the conditioning equipment, such as the cutting tool and the welding head, have been installed, the drive means 31 may be utilized to rotate the turbine runner. The material of the draft tube wall may be machined off to the desired depth. Weld material such as stainless steel may then be applied to the wall (a carbon-steel build-up layer may be initially applied to the wall subsequently covered by the stainless steel surface). The tube surface may be again machined to smooth the stainless steel build-up. Severely damaged outer edges of the blades 17 may have sections removed and the gaps renewed with stainless steel sections, these operations on the blades 17 being carried on by an operator with hand held tools while the machining and welding of the tube surface proceeds as the turbine runner is rotated.

The drive unit 31 is operable from the control panel 36 and, preferably, also from the runner itself so that rotation of the runner is under the control of an operator stationed on the runner itself. Emergency braking of the rotation of the turbine runner can preferably be accomplished either from the runner itself or at the control panel 36, the braking function utilizing the conventional air or other brake system built into the generator structure independently of the normal braking control of the generator. In effect, a vertical boring mill is constructed to condition the turbine draft tube surface with the turbine runner itself acting as the moving component of the boring mill.

After the conditioning operation directed to the runner blade surfaces and the draft tube surface has been completed, the equipment including the machining head 38 and supporting structure 36 is removed, together with the scaffold 42 and the supporting structure for the welding equipment, also the temporary floor 24 and the drive unit 31. The generator may then be placed back in operation and the equipment moved to a further hydroelectric generator unit in the installation.

I claim:

1. A method of repairing cavitation-induced pitting in the draft tube wall area and runner blades of a hydraulic turbine component of a hydroelectric installation without requiring any disassembly thereof, said method comprising: initially removing water from the turbine draft tube, subsequently attaching a collector ring assembly to the turbine runner and through it providing access to electrical and pneumatic tooling power on the runner as it is rotated within the draft tube, mounting draft tube wall surface conditioning devices on the runner which are positioned to extend from the runner into proximity with the draft tube wall, providing an auxiliary drive means suitable for mechanically rotating the rotor of the generator component normally driven by the hydraulic turbine to thereby produce relatively slow rotation of the turbine runner, subsequently employing said drive means to rotate the runner relatively slowly within the draft tube to cause the surface conditioning devices to traverse the curved surface of the draft tube wall, and then removing the collector ring assembly, the surface conditioning devices and the auxiliary drive means.

2. A method as claimed in claim 1 in which the runner is rotated at a speed such that the surface conditioning devices move at a speed of 250 to 350 feet per minute.

3. A method as claimed in claim 1 in which welding and finishing of pitted areas of the runner blades by means of hand-held tools is caused to proceed as the runner is rotated for movement of the surface conditioning devices over the draft tube wall surface.

4. A method as claimed in claim 1 but including the additional step, after water removal of installing a temporary floor surface in the draft tube spaced from the turbine runner.

* * * * *